United States Patent [19]
Doner

[11] Patent Number: 5,649,292
[45] Date of Patent: Jul. 15, 1997

[54] OBTAINING IMPROVED FREQUENCY REUSE IN WIRELESS COMMUNICATION SYSTEMS

[75] Inventor: John R. Doner, Sebastian, Fla.

[73] Assignee: AirNet Communications Corporation, Melbourne, Fla.

[21] Appl. No.: 331,455

[22] Filed: Oct. 31, 1994

[51] Int. Cl.$^6$ .................................................. H04Q 7/36
[52] U.S. Cl. ............................................................ 455/447
[58] Field of Search .................... 455/33.1, 33.2, 455/33.3, 33.4, 34.1, 34.2, 50.1, 53.1, 54.1, 54.2, 56.1, 62; 379/60, 59

[56] References Cited

U.S. PATENT DOCUMENTS

| | | | |
|---|---|---|---|
| 4,128,740 | 12/1978 | Graziano | 455/33.1 |
| 4,144,496 | 3/1979 | Cunningham et al. | 455/33.3 X |
| 4,654,879 | 3/1987 | Goldman et al. | 455/33.2 |
| 5,073,971 | 12/1991 | Schaeffer | 455/33.1 |
| 5,161,249 | 11/1992 | Meche et al. | 379/60 X |
| 5,355,367 | 10/1994 | Comroe et al. | 455/33.1 X |
| 5,365,571 | 11/1994 | Rha et al. | |
| 5,459,759 | 10/1995 | Schilling | 379/59 |
| 5,475,864 | 12/1995 | Hamabe | 455/62 X |

FOREIGN PATENT DOCUMENTS

| | | |
|---|---|---|
| 2230126 | 12/1974 | France . |
| 93/23935 | 11/1993 | WIPO . |

*Primary Examiner*—Reinhard J. Eisenzopf
*Assistant Examiner*—Philip J. Sobutka
*Attorney, Agent, or Firm*—Hamilton, Brook, Smith & Reynolds, P.C.

[57] ABSTRACT

A technique for allocating frequencies in a cellular communication system. The frequency reuse plan divides all available frequencies into six groups with the frequencies assigned in an ascending index order modulo 6. A three cell reuse plan is implemented with six 60° sectorized antennas per cell, and two frequency groups being assigned for use in each cell. The channel groups are allocated to the sectors such that no two adjacent sectors use the same frequency groups. As a result, an effective times one frequency reuse plan is implemented. A frequency assignment process which attempts to avoid assigning the same frequency to a mobile which is located in the outer portion of a sector which is also in use in potential interfering outer sectors of homologous cells insures that carrier to interference (C/I) ratio minimums can be met without specialized encoding techniques.

14 Claims, 10 Drawing Sheets

Z = ALL f's AVAILABLE IN SECTOR.
G1, G2, G3, G4, G5 AND G6
S = f's IN USE IN SECTOR
$O_1, O_2, O_3$ = f's IN USE IN INTERFERING OUTER SCTORS

100 MAINTAIN SETS Z AND $O_1, O_2, O_3$ AND S FOR EACH SECTOR

101 MOBILE REQUESTS SERVICE

102 DETERMINE WHETHER MOBILE IS IN INNER OR OUTER PORTION OF SECTOR

103 IF MOBILE IS IN INNER SECTOR THEN

104 ASSIGN $f_{new}$ FROM Z ~ S

105 ELSE MOBILE IS IN ORDER SECTOR

106 DETERMINE UNION OF ALL FREQUENCIES IN USE IN THREE INTERFERING HOMOLOGOUS CELLS I = $O_1$, u $O_2$ u $O_3$

107 IF I ≠ Z THEN CHASE ANY $f_{new}$ IN Z ~ I 108 f I = Z THEN (PERFORM IN-SECTOR HANDOFF)

109 ASSIGN AN EXISTING INNER SECTOR MOBILE IN f = I

110 REASSIGN AN INNER SECTOR MOBILE f TO THE NEW MOBILE

111 IF Z ~ I IS EMPTY (NO f's AVAILABLE) ASSIGN ANY f IN Z ~ S

*FIG. 7*

OBTAINING IMPROVED FREQUENCY REUSE IN WIRELESS COMMUNICATION SYSTEMS

FIELD OF THE INVENTION

This invention relates generally to cellular radio frequency communications and in particular to a technique for assigning frequencies to mobile units according to a reuse pattern.

BACKGROUND OF THE INVENTION

The ever-increasing demand for wireless communication services, such as cellular mobile telephone (CMT), digital cellular network (DCN), personal communication services (PCS) and the like, requires the operators of such systems to attempt to make maximum effective use of the available radio frequency bandwidth. Consider, for example, that a system operator is typically allocated a geographic territory and a certain amount of bandwidth that affords the ability to transmit and receive on a particular number of different channel frequencies. In an effort to make the best use of the allocated frequency space, the geographic territory is divided into a number of sub-areas called cells. A number of radio base stations are deployed throughout the assigned territory, with there typically being one base station located in each cell. Transmission power levels are then kept low enough so that mobile units in adjacent cells do not interfere with each other.

The system operator then determines how to split up his allocated frequency channels among the cells. Often, an extensive study is necessary to determine how to best allocate the channels to the available cells. This study attempts to minimize the interference between adjacent base stations while also determining how to best reuse the channels, that is, how to best allocate respective channels to more than one base station, in order to maximize channel availability in the service area.

In the process of performing such a study, cellular system designers generally rely upon an idealized model of cell placement, which is usually assumed to be a grid of hexagonally shaped cells overlying the service area. The object of the frequency planning process is to reuse each frequency as often as possible within the service area. Cells which reuse the same frequency set in this manner are referred to as homologous cells.

In general, reusing a frequency in every Mth cell thus means that 1/Mth of all frequencies are available in any given cell. It is therefore desirable to select an M-cell frequency assignment pattern, with M being as small as possible, in order to increase the capacity for handling mobile units in each cell.

In one common cellular frequency reuse scheme, directional antennas are deployed at every alterative corner of a cell to illuminate each cell. In this manner, channel assignments may be made in a repeating pattern of seven cells, until the entire area under control of the service provider is covered.

U.S. Pat. No. 4,128,740 issued to Graziano and assigned to Motorola, Inc. discloses another frequency allocation plan. Each cell site in that scenario is divided into six sectors. The frequencies available to the service provider are then divided among the six sectors such that adjacent channel interference is avoided for a given sub-array of four cells.

Another pattern which provides a reuse factor as low as two is disclosed in U.S. Pat. No. 5,073,971 also assigned to Motorola, Inc. This is accomplished through asymmetrical positioning of the repeating patterns so that they radiate towards one another in alternating rows.

Such schemes which reduce the reuse factor to a minimum value are at odds, however, with the fact that as M decreases, so does the distance between the homologous cells, so that the amount of interference between users of the same frequency in different cells increases. This interference between users of the same frequency in homologous cells is called co-channel interference. The ratio between the power of the desired carrier signal C and the co-channel interference I is often referred to as the carrier to interference ratio (C/I). Thus, as the reuse factor M decreases, this C/I ratio is normally expected to increase.

It is accepted wisdom that the conventional seven-cell reuse pattern provides adequate C/I ratios between homologous cells in systems making use of the Advanced Mobile Phone Service (AMPS) protocol, which is dictated by that standard to be 17 decibels (dB).

However, the above-mentioned four-and three-cell reuse patterns are typically understood to fall short of providing the necessary carrier to interference level for AMPS. Such three and four-cell reuse patterns are thus typically believed to only be practical in systems making use of other transmission techniques such as digital cellular systems that use code division multiple access (CDMA) or time division multiple access (TDMA) to achieve coding gain. The coding gain provided by such systems thus provides the ability to tolerate a lower C/I ratio without degradation of the service provided to homologous cells.

What is needed is a way to genuinely obtain a high degree of channel reuse by partitioning the use of frequencies among sectors, without also imposing a need for coding schemes and the like to minimize adjacent channel interference.

DESCRIPTION OF THE INVENTION

Summary of the Invention

Briefly, the invention is a cellular communication system which employs a number of base stations that each include an array of six directional sector antennas. The sector antennas are centrally located in each cell to radiate into a sub-portion of the cell such as a sixty (60) degree arc. Each sector has a group of frequencies assigned to it that is the same as the group of frequencies assigned to two of the other sectors within that same cell. Thus, there are two different groups of frequencies assigned to each cell. These patterns of two frequency groups are then repeated in homologous groups of three, to effectively provide the same reuse level as a one-cell frequency reuse pattern.

The invention further provides a way to implement this one-cell frequency reuse level for practical use in AMPS-type signaling environments by further dividing the frequencies assigned to a particular sector into inner and outer sub-sectors. In one preferred embodiment, the boundary between inner and outer sub-sectors is located at a position which divides the area of the sector into equal area sub-sectors, so that on average one-half of the mobile units are located in each of the sub-sectors.

Frequencies in use in a particular sector of interest are then designated according to a particular algorithm, such that whenever possible, the frequencies assigned for operation in the outer sectors of adjacent homologous cells are mutually exclusive.

This is accomplished by performing a frequency assignment procedure as follows. When a new mobile unit requests service from a base station in a particular cell, the base station first determines whether the new mobile is in the inner or outer sub-portion of the corresponding sector. This determination may be made in a number of ways, such as by using conventional received signal strength indication (RSSI) measurements to determine the power level of the carrier signal received by the base station from the mobile unit.

If the mobile is in the inner sub-sector, then any available frequency not already in use from the frequency set assigned to the sector is assigned to the new mobile unit.

If, however, the new mobile is located in the outer sub-sector, then the frequency assignment process attempts to find a frequency which is not already in use in the potentially interfering outer sectors of the nearest three homologous cells.

This procedure can be described more particularly as follows. Designate Z as the set of frequencies assigned for use in the sector where the new mobile is located, that is, set Z contains one-sixth of all of the available frequencies. Also define S as the set of frequencies already in use in the sector of interest, and also define a set I as the set the frequencies in use in any of the three nearest interfering outer sectors of homologous cells.

The basic assignment algorithm then proceeds as follows. If the new mobile is in an inner sub-sector, then a frequency for the new mobile is selected from the set of all frequencies which are not already in use, namely the set Z∪~S.

If however, the new mobile unit is in an outer sub-portion of the sector, then the base station first determines a set of frequencies consisting of a set, I, which is a union of all frequencies in use in the three interfering homologous outer sectors. If the set of frequencies in the set I is less than the entire assigned frequency set Z, then any frequency in the set assigned to the sector but which is not already in use in the homologous sectors, namely the set Z∪~I, may be assigned to the new mobile.

In the event, however, that all of these are already in use, that is, in the event that the set Z equals the set I, then an in-sector hand-off is performed. The in-sector hand-off attempts to swap a frequency already assigned to a mobile in the inner sub-sector to the new mobile, in an attempt to avoid assigning a frequency which would otherwise conflict with the outer sectors in the homologous cells. In that case, a frequency in the set Z∪~I is thus freed for the new mobile in the outer sector, and any frequency in the set I can then be assigned to the existing inner sector mobile.

Finally, if the set Z∪~I is empty, that is, if no potentially non-interfering frequencies are available, then the new mobile is simply assigned any available frequency in the set I∪~Z.

There are a number of possible variations which do not depart from the true spirit and the scope of the invention.

The frequency plan may assign the six frequency groups to the sectors of each cell such that no adjacent channel sets are in use along any cell sector boundaries.

In another variant, the above-described frequency assignment process may consider not only the inbound interferers in the three nearest outer sub-sectors of the homologous cells, but may also consider the interference which may arise due to an outer sector frequency assignment in neighboring non-homologous cells.

In yet another alterative, the boundary between the inner and outer sub-sectors may be adjusted to something other than the distance which divides the area in the sector in half, that is, something other than 0.707 of the cell radius. By so adjusting this boundary, an increase in the carrier to interference (C/I) level in one cell can be traded off against a decrease in carrier to interference level experienced by neighboring homologous cells.

The information necessary to ascertain the members of the set I may be collected in various ways. It may be determined at a centralized base station controller by collecting data made available from frequency assignments made in all cell sectors. However, when this is not possible, such as when all cells in the service area are not under control of a single base station cluster controller, then an individual base station may use a scanning receiver and an omni-directional antenna to determine which frequencies are already in use in the outer sectors of the interfering homologous cells.

BRIEF DESCRIPTION OF THE DRAWINGS

For a more complete understanding of the invention and its novel advantages and features, reference should be made to the accompanying drawings in which:

FIG. 7 is a flow chart of a procedure used by a base station controller to assign frequencies to mobile units.

DETAILED DESCRIPTION OF A PREFERRED EMBODIMENT

Figure 1:
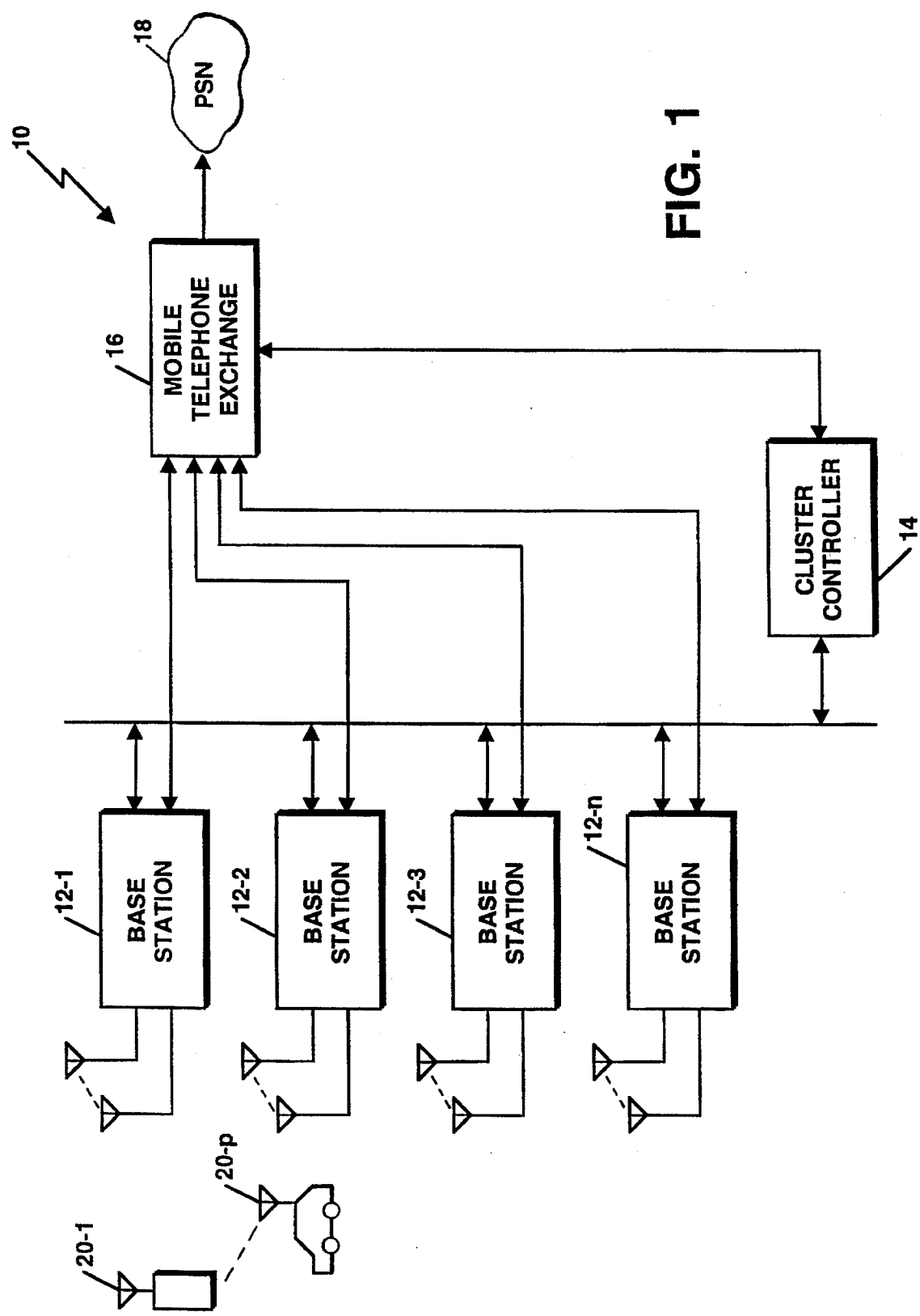
FIG. 1 is a block diagram of a wireless communication system according to the invention.

Turning attention now to the drawings, FIG. 1 illustrates a cellular communication system 10 in which the invention may be advantageously employed. The system 10 includes a plurality of antenna sites or base stations 12 with each base station 12 being associated with a sub-area, or cell, of the entire geographical area assigned to the service provider.

A number of the base stations 12-1, 12-2, 12-3, . . . , 12-n are arranged in a group, or cluster. A cluster controller 14 and a mobile telephone exchange 16 provide connections between the base stations 12 in a cluster and a public switched telephone network 18. The system 10 thus permits mobile units 20-1, ..., 20-p to communicate with each other or with other devices that may be connected to the telephone network 18. The cluster controller 14 is responsible for coordinating these connections by coordinating the operation of the base station 12 and the telephone exchange 16, to set up the appropriate interconnection between the subscribers of the landline telephone exchange 18 and the mobile units 20, in a manner which is well known.

Figure 2:
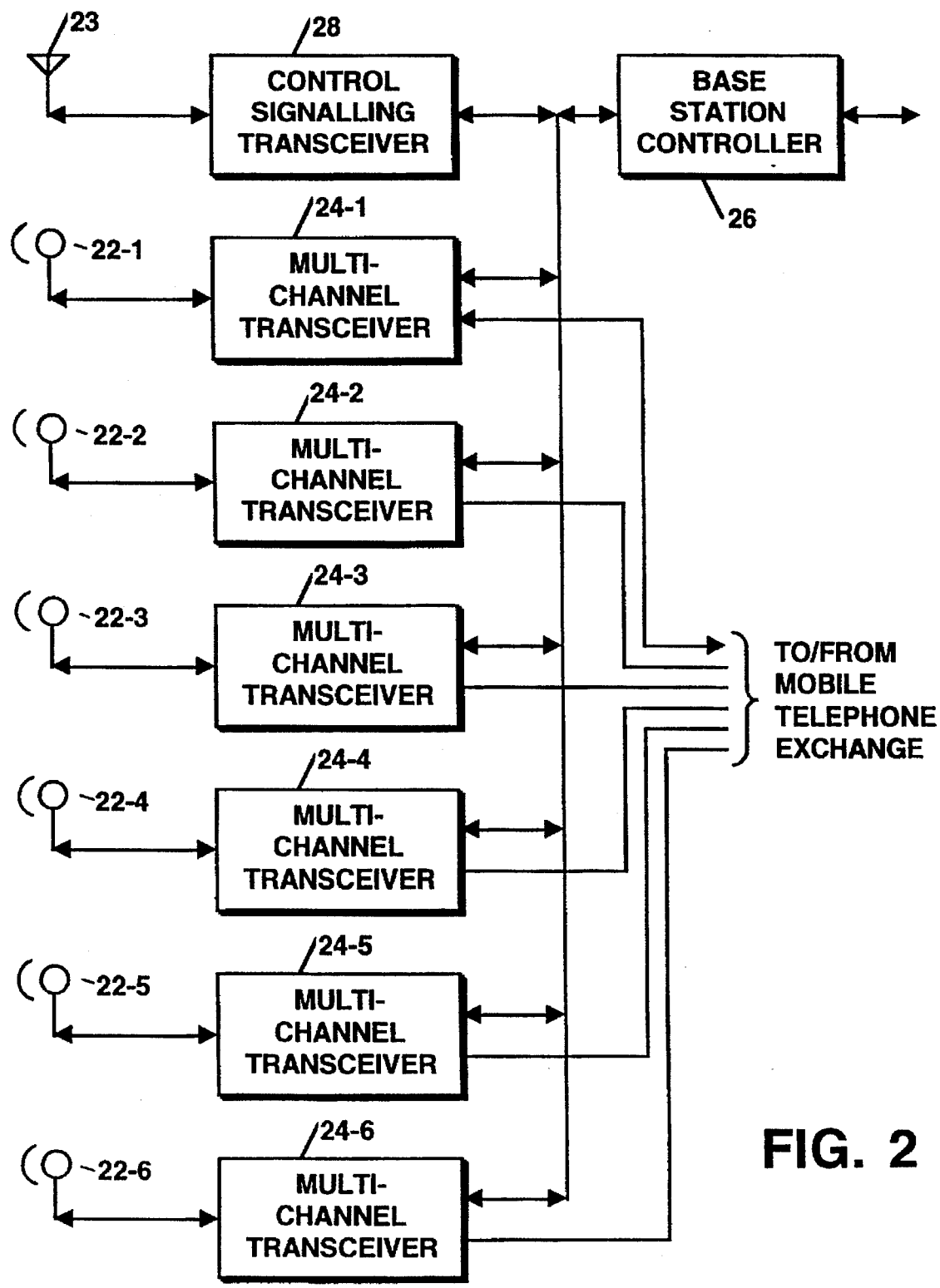
FIG. 2 is a block diagram of the arrangement of one of the base stations of FIG. 1.

FIG. 2 is a more detailed view of one of the base stations 12. As shown, the exemplary base station 12 includes six sector antennas 22-1, 22-2, 22-3, 22-4, 22-5, and 22-6. Each of the sector antennas 22 is provided to support radio communication with mobile units 20 located within one of the sixty degree (60°) sectors of the cell being serviced by the base station 12. Each of the sector antennas is in turn connected to a corresponding multichannel transceiver 24-1, 24-2, ..., 24-6. In accordance with the present invention, the components of each base station 12, including the sector antennas 22 and transceivers 24 are located substantially in the center of a respective one of the cells of the cellular communication system 10.

The multichannel transceivers 24 operate in conjunction with a base station controller 26 to provide required filtering, modulation and demodulation functions so that the radio signals received from and provided to the mobiles 20 may be individually isolated and connected to the PSTN 18.

In addition, an omni-directional antenna 23 may be connected to a control signaling receiver 28 to permit transmission and reception of control signals between the base station controller 26 and the mobiles 20. The control signals are those required in any conventional cellular system, such as those signals required to set up a connection with the telephone network 18. For example, when a mobile unit 20 first requests service, it issues a control signal which is received by the omni-directional antenna 23 and control signaling transceiver 28, and forwarded to the base station controller 26. The base station controller 26 then determines a frequency assignment for the new mobile unit, and arranges for the multichannel transceivers 24 and sector antenna 22 servicing the sector in which the mobile unit is located to handle communications with the mobile unit 20.

Figure 3A:
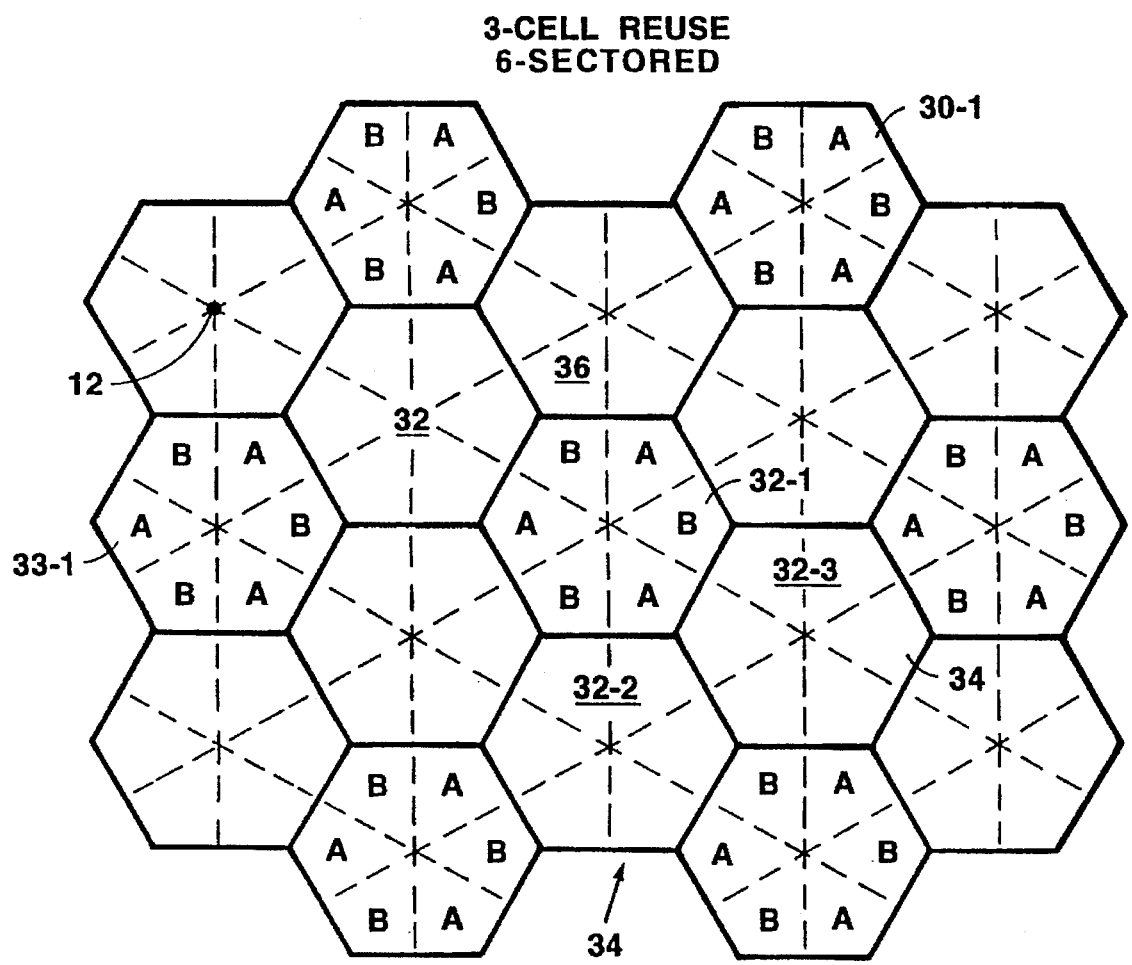
FIG. 3a is an illustration of a frequency assignment scheme according to the invention wherein the available frequencies are divided into six groups, with two groups assigned to the sectors of each cell, so that frequencies are reused every three cells.

As illustrated in FIG. 3a, a given area for which the system 10 is to provide communication services is organized into hexagonal cells 32, with each cell 32 being further divided into six sectors 36. A sector antenna 22 (FIG. 2) and multichannel transceiver 24 are thus associated with each sector 36 in a given cell 32.

In accordance with one aspect of the invention, frequency assignments are made to sectors of each of the cells, and are repeated for a given number of cells. In the embodiment described herein, the cell assignments are repeated for groups 34 of three cells, such that an exemplary group 34 consists of cells 32-1, 32-2, and 32-3. These groups 34 thus form patterns of homologous cells, such as cells 32-1, 30-1, and 33-1, which have the same frequency assignment pattern.

Also note that in FIG. 3a, the sectoring of a three cell reuse scheme in this manner allows only one-third of all available frequencies to be used in any given cell 32. However, since each frequency is used in three sectors 36 within each cell 32, a frequency plan according to the invention is thus effectively a one-cell frequency reuse plan.

The three cell repeat pattern results in six surrounding homologous cells providing interfering signals each at a distance of only three cell radii away, as shown in FIG. 3a. In order to overcome this difficulty, which would otherwise result in a desired signal to interface (C/I) ratio which is unacceptable, the frequencies assigned to each cell are further partitioned into two sets, A and B. The sets A and B are then assigned to alternate sectors within each cell, as illustrated. A exemplary cell 32-1 thus consists of six sectors with alternate frequency set assignments A and B made to adjacent cells.

Figure 3B:
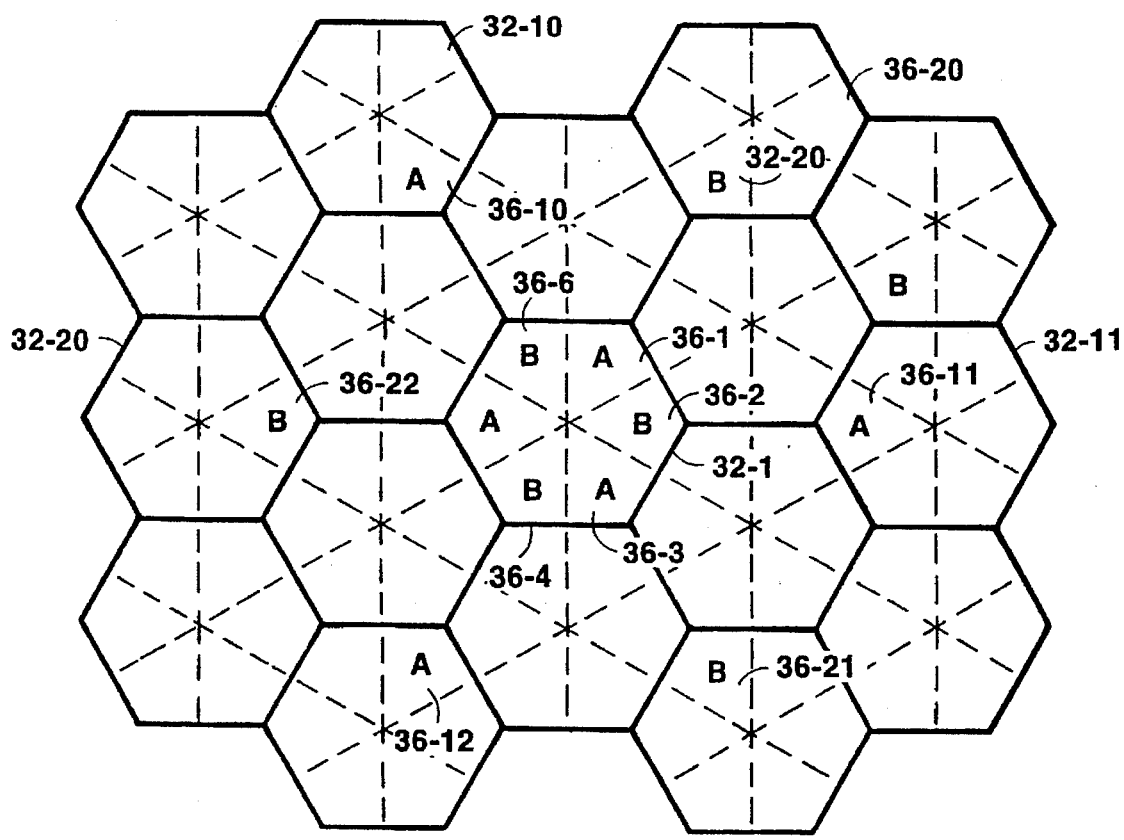
FIG. 3b is an illustration of the frequency assignment plan showing the locations of the three nearest interfering outer sub-sectors in homologous cells.

FIG. 3b illustrates how this frequency assignment technique reduces the number of interfering signals from homologous cells by one half for any given frequency.

For example, the sectors 36-1, 36-3, ..., 36-5 which have been assigned to use frequency set A in cell 32-1, only have three interfering homologous sectors 36-10, 36-11, and 36-12 located in cells 32-10, 36-10, and 36-12, respectively. Likewise, the sectors of cell 32-1 to which frequency group B has been assigned, namely sectors 36-2, 36-4, and 36-6, each receive interference from the nearest homologous sectors 36-20, 36-21, and 36-22 located in cells 33-20, 32-21, and 32-22 respectively.

Figure 5:
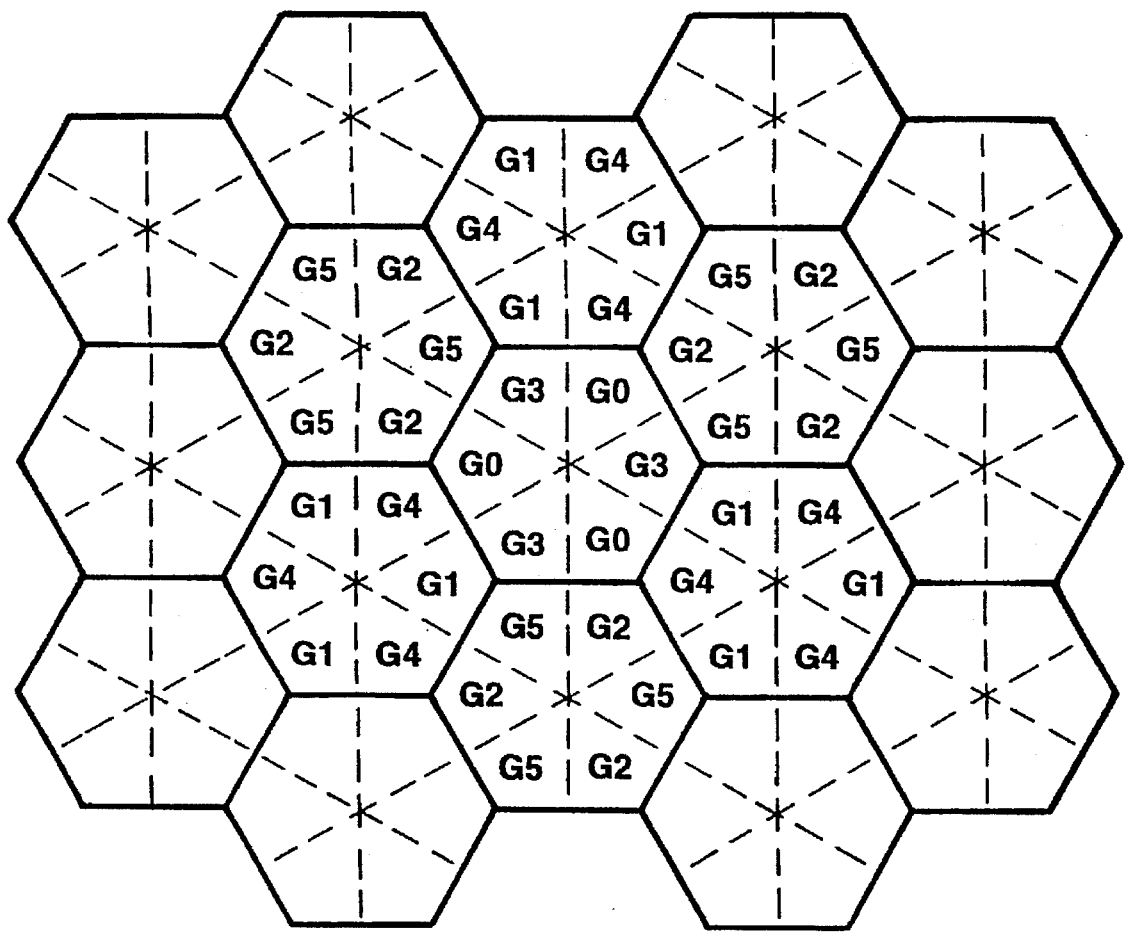
FIG. 5 is a detailed frequency plan showing a preferred assignment of frequency groups to sectors such that no adjacent channels are used along any cell or sector boundaries.

FIG. 5 is a plot, corresponding to FIG. 3a, but showing one specific preferred grouping all of the six sets of frequencies in a given cell group 34 according to the invention. As explained previously, the range of frequencies in the radio band available to the service provider are divided into six orthogonal groups. Assuming that the channel numbers are assigned to frequencies consecutively, and that the channel numbers increase by one across all available frequencies, a given channel group $G_i$ comprises all channels with numbers congruent to i modulo 6. In other words, if the center frequencies of the available channels are given integer numbers beginning with number 1, the set $G_1$ consists of frequency numbers [1, 7, 13, . . .], the set $G_2$ consists of the frequency numbers [2, 8, 14, ... ], and so on, with the set $G_6$ consisting of frequency numbers [6, 12, 18, . . .]. Thus, This group assignment scheme insures that no adjacent frequencies are used along any cell or sector boundaries. For example, in an exemplary sector 36-2, which has been assigned a frequency group $G_3$, only frequencies in groups $G_0$, $G_5$, and $G_1$ appear along the boundaries. Thus, there is always at least one unused frequency between active frequencies, thereby avoiding adjacent channel interference in adjacent cell sectors.

This arrangement is in contrast to a standard seven cell reuse scheme, which results in adjacent channel interference along two boundaries of adjacent cells.

Figure 4:
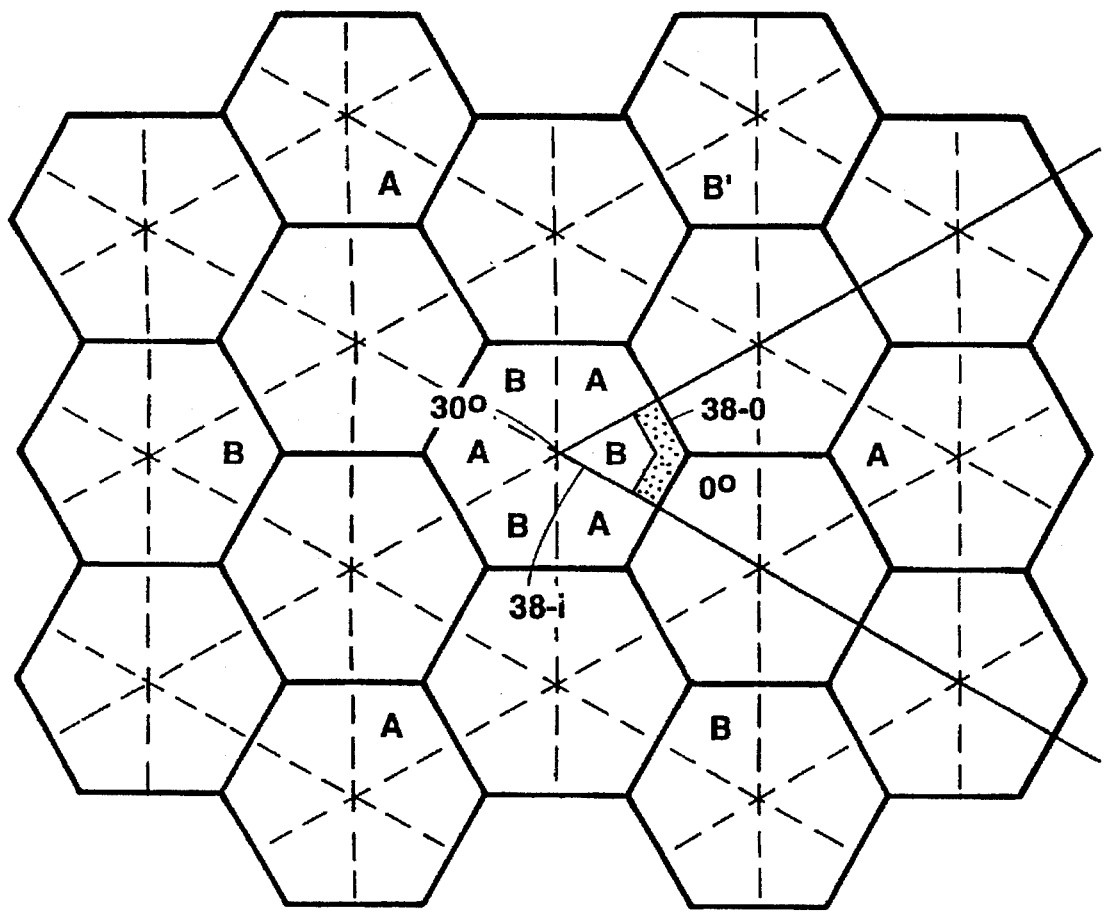
FIG. 4 illustrates how frequency assignments to mobile units in an outer portion of a sector are chosen from among frequencies not in use in three nearest interfering outer sub-sectors.

In a further attempt to reduce interference between homologous sectors in accordance with the invention, frequency assignments to specific mobile units are preferably made depending upon the location of the mobile unit within the sector. In particular, as shown in FIG. 4, an exemplary sector 36-2 is logically divided into an inner and outer sub-sector 38-I and 38-O respectively. In the preferred embodiment, the dividing line between the inner sector 38-I and outer sector 38-O is located such that the physical area devoted to the inner 38-I and the outer 38-O sub-sectors is the same. This assures that, on average assuming a uniform density of mobile traffic, one-half of the mobiles are located inner sub-sector.

Briefly, the frequency assignment process proceeds as follows. First, if the mobile unit is located in an inner portion of a sector, then any unused frequency in the set (e.g., one of the sets $G_1$, $G_2$, ..., $G_6$) assigned to the sector is selected.

If, however, the mobile unit is located in an outer portion of the sector, a frequency assignment is made such that frequencies in use in the outer portions of the sectors in homologous cells are mutually exclusive.

Failing that, an in-sector hand-off is performed, to reassign a frequency presently in use in the inner sector to the new mobile which satisfies the mutual exclusivity of cells criterion, and then the inner sector mobile is given any available frequency in the set assigned to the sector.

Figure 6:
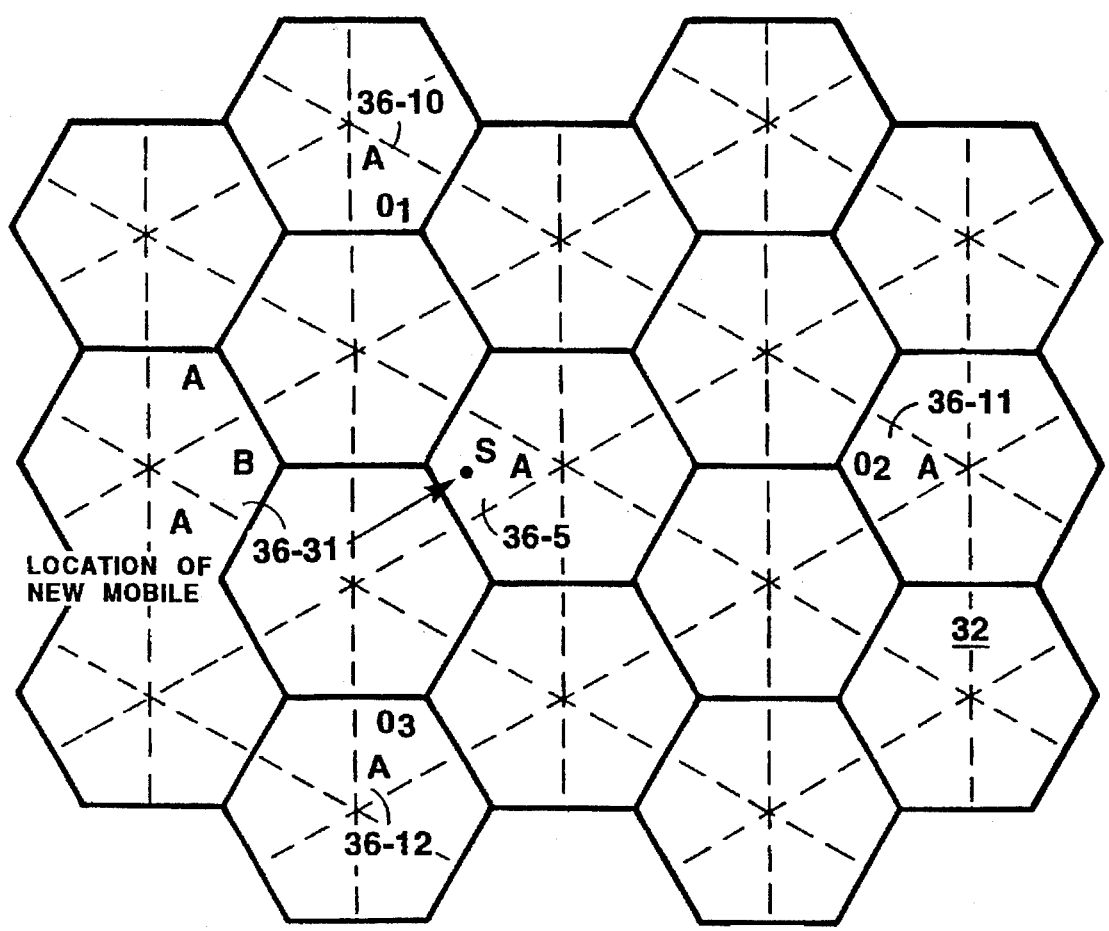
FIG. 6 depicts the manner in which the assignment of a frequency to a new mobile depends upon the existing assignments of frequencies in the outer sectors of homologous cells and/or non-homologous cells.

Turning attention now to FIGS. 6 and 7, this process for determining how newly assigned frequencies from the six sets are allocated within each cell will be described in greater detail. Referring first to FIG. 6, a sector 36-5 in which a new mobile assignment to be made is shown together with the locations of the three interfering homologous sectors 36-10, 36-11, and 36-12. In the following discussion, the set of all frequencies assigned to for use in a particular sector of interest, such as sector 36-5 is given by the variable Z; the set of frequencies already in use in the sector of interest 36-5 are referred to as the set S; and the set of frequencies in use in the outer sectors of the three homologous cells, namely the outer portions of sectors 36-10, 36-11, and 36-12, are designated by the sets $O_1$, $O_2$, and $O_3$ respectively. The union of these three sets, with represents all of the frequencies in use in the outer sectors of the three nearest homologous cells, is referred to as the set I.

With that understanding, the steps of a frequency assignment procedure performed by the base station controller 26 are shown in FIG. 7. In a first step 100, the base station controller 26 performs a set of operations to maintain the frequency sets Z, S, and $O_2$, $O_2$, and $O_3$ for each sector.

This may be done by, of course, monitoring which frequencies in the set Z are assigned to be used as mobile units come on line in each sector of the base station 12, and by periodically exchanging messages with the other base station controllers 26 that indicate which frequencies are in use in the other base stations 12.

Control eventually passes to a step 101, wherein a mobile unit 20 is requesting service from the base station 12.

In step 102, the controller 26 first determines which sector 36 the mobile 20 is in, and whether it is in the inner or outer portion of that sector 36. The sector determination can be made in any conventional fashion, such as by comparing the received signal strength indication (RSSI) of the control signals received when the mobile requests access at each of the sector antennas 22 associated with the base station 12. The sector 36 associated with the antenna 22 providing the strongest RSSI is then assumed to be the sector in which the mobile 20 is located.

The inner 38-I or outer 38-O sub-sector determination may then be made, by comparing the RSSI from the corresponding sector antenna 22 to a threshold value.

If the RSSI is strong enough to indicate that the mobile 20 is located in an inner sector in step 103, then control passes to step 104 where a frequency is assigned to the new mobile from a Z∪18 S, that is, the compliment of set S in Z. In other words, the new mobile is assigned any unused frequency in the set Z which is not already in use.

If however, the new mobile is located in the outer subsector 38-I, then control passes to step 106 where the first operation is to determine the members of the set of all frequencies in use in the three closest interfering homologous cells. As was illustrated in FIG. 3b, this set I consists of each of the frequencies in sets $O_1$, $O_2$, and $O_3$ representing the frequencies in use in the homologous outer subsectors 36-10, 36-11, and 36-12 respectively.

In the next step 107, it is determined whether the membership of set I is less than the entire assigned frequency set, Z. If so, then frequencies are still available for use and the base station can chose a frequency for the new mobile to be any of the frequencies in the set Z∪~I.

If this is not true, however, then the frequencies in use in the homologous cells are the same as the set of all frequencies in use. In this event, a sector hand-off procedure is performed in step 109, where an existing inner sector mobile is reassigned a frequency in the set I, and in step 110, where the previous inner sector mobile frequency is now assigned to the new mobile unit in the outer sector.

If, however, the test in step 108 was not true, that is, if the set Z∪~I is empty, indicating that no frequencies are available in set Z which are not in use in the outer sub-sectors of the homologous cells, then any frequency in the set Z∪~S may be assigned to the mobile unit in step 111, that is any frequency not in use in the current sector.

There are a number of possible variations associated with particular steps of the process described in FIG. 7. First, the information maintained in step 100 may determine in various ways. For example, when it is not possible for the base station controller 26 to request data concerning the frequency assignments of adjacent base stations 12 by making an inquiry to the cluster controller 14, such as in an instance where the base stations 12 are not all under control of a single base station cluster controller 14, then the base station 12 can make use of a scanning receiver 28 and omni directional antenna 23 (FIG. 2) to measure a receive signal strength indication (RSSI) in the frequency range of interest, to determine which frequencies appear to be in use.

Secondly, in step 102, the determination as to whether the mobile is an inner or outer portion of the sector can be made by other than a median distance determination. In particular, the receive signal strength indication (RSSI) level indicating the demarcation between inner and outer sector mobiles can be changed as needed. This permits a local carrier to interference (C/I) ratio in one of the sectors in one of the base stations 12 to be traded off for a greater or lesser C/I ratio experienced by neighboring homologous cells.

Thirdly, in the process of determining a new frequency for use in outer sub-sector in steps 108 through 111, a potential for outbound interference can be accommodated. This is the interference which might otherwise arise in neighboring non-homologous cells. In particular, the frequency assignment process may also attempt to assign a frequency from the set Z∪~I which is not also in use in the outer sub-sectors 36-30 and 36-31 (FIG. 6) of the nearest non-homologous cell which are in the direct path of the sector 36-5 under consideration.

Figure 8A:
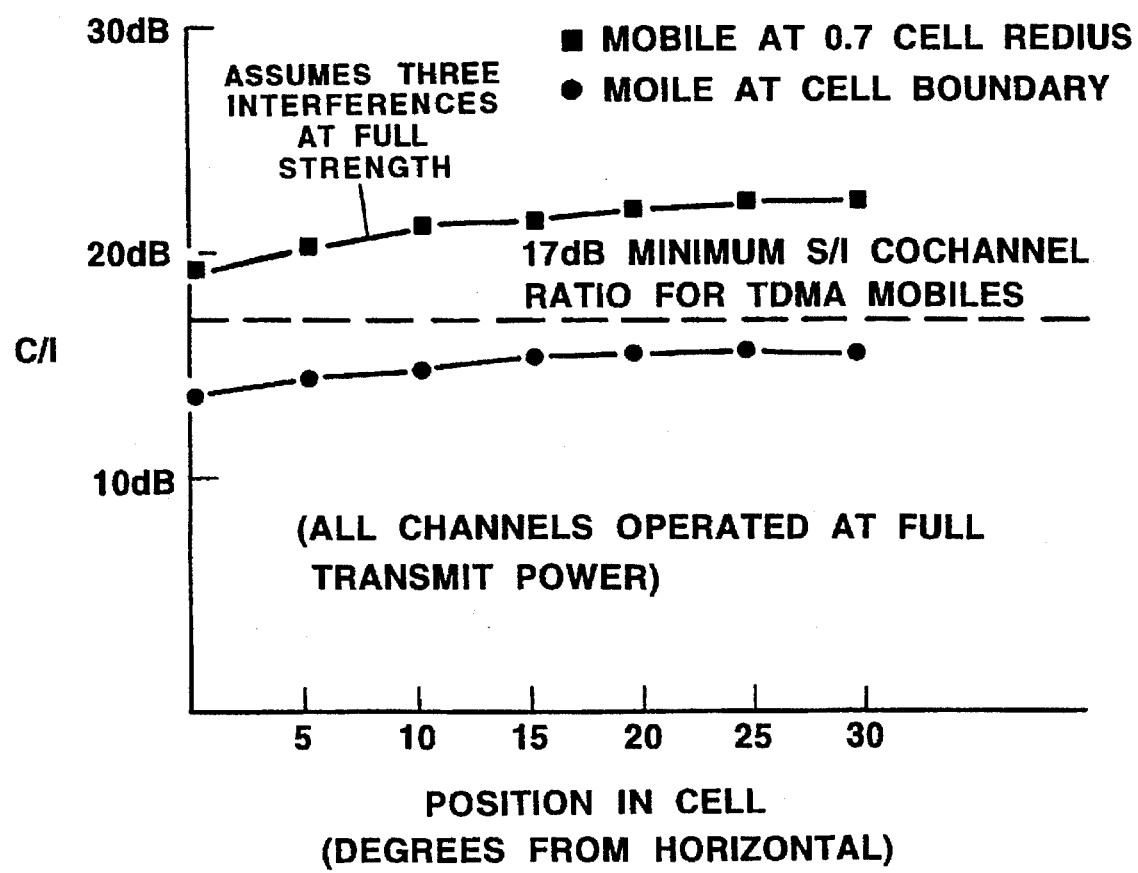
FIGS. 8a and 8b are plots of carriers to interference (C/I) ratio versus positions in the cell indicating the improvement available with the invention.
Figure 8B:
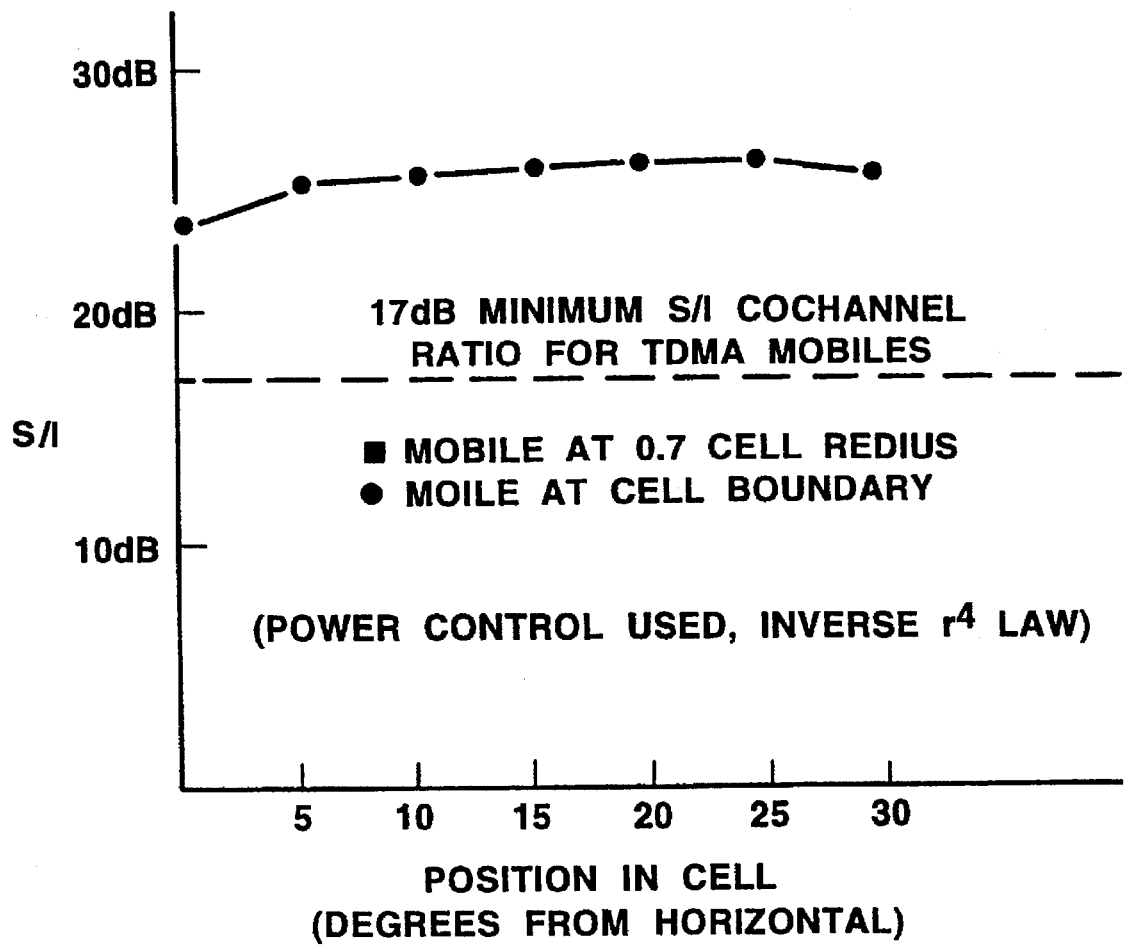

FIG. 8a is a plot of carrier to interference (C/I) in decibels versus the position of the mobile in its sector, in degrees from a central line through the center of the sector (FIG. 4). The graph shows the C/I for a mobile unit located at the outermost boundary of the sector, and assumes that there are three active mobiles operating on the same frequency in the outer sectors of the closest homologous cells. FIG. 8a shows this relationship for a frequency assignment scheme which does not take into account the frequency assignments in homologous sectors. The C/I ratio drops below the 17 dB minimum ratio acceptable level at certain radii.

If, however, a frequency assignment scheme is used in accordance with the invention in which frequencies are assigned to mobiles in the outer sub-sector from among those frequencies not used in the outer sub-sectors of homologous cells, an approximately 11 dB improvement is experienced. This then provides an adequate margin above the 17 dB minimum.

The invention thus provides a number of unique advantages for a cellular frequency reuse plan.

The three-cell frequency reuse scheme with sectoring and dynamic frequency assignment provides carrier interference ratios superior to standard seven-cell reuse.

The frequency set assignments can be made among sectors to provide adjacent channel interference superior to even seven cell reuse plans.

By reusing each frequency three times in a given cell with a three cell repeat pattern, the equivalent of one cell frequency reuse is achieved, and this advantage is obtained without dynamic antenna being forming rather complex antenna techniques.

The foregoing description has been limited to specific embodiments of this invention. It is apparent, however, that variation and modifications may be made to the invention as described above with the attainment of some or all of its advantages.

What is claimed is:

1. A cellular communication system consisting of a plurality of cells, the plurality of cells being located substantially adjacent to one another, with each cell containing a plurality of antennas centrally located in the cell and radiating into sixty-degree (60°) sectors of the cell, to thereby provide six sectors per cell, the system comprising:

means for grouping available frequencies into at least six groups, with the assignment of frequencies to frequency groups being exclusive such that any one available frequency is only assigned to one group;

means for providing uniform reuse of the at least six frequency groups in the cells by selecting two and only two frequency groups of the at least six frequency groups to be used in at least one of the cells so that only two frequency groups are used in any given cell, to thereby form sets of homologous cells having the same two frequency groups assigned thereto;

means for assigning the two frequency groups in at least one of the homologous cells to alternate sectors in each cell, such that no two adjacent sectors in the same cell are assigned the same one of the two frequency groups, and such that all frequencies of a group are used in one of the alternating sectors; and means for determining when a mobile unit in one of the sectors is requesting access to the system and if so, whether the mobile unit is located in an inner portion or outer portion of the sector; and means for assigning a frequency to the mobile unit from the frequency group assigned to the sector depending upon whether the mobile unit is located in the inner or the outer portion of the sector.

2. A cellular communication system as in claim 1 wherein the means for providing uniform reuse assigns three sets of two frequency groups in a repeating pattern of three cells a piece.

3. A cellular communication system as in claim 2 wherein the means for providing uniform reuse assigns three sets of two frequency groups in a repeating pattern of three cells apiece such that no frequency groups containing adjacent frequencies are positioned along any cell or sector boundary.

4. A cellular communication system consisting of a plurality of cells, the plurality of cells being located substantially adjacent to one another, with each cell containing a plurality of antennas centrally located in the cell and radiating into sixty-degree (60°) sectors of the cell, to thereby provide six sectors per cell, the system comprising:

means for grouping available frequencies into at least six groups, with the assignment of frequencies to frequency groups being exclusive such that any one available frequency is only assigned to one group:

means for providing uniform reuse of the at least six frequency groups in the cells by selecting two of the at least six frequency groups to be used in at least one of the cells so that only two groups are used in any given cell, to thereby form sets of homologous cells having the same two frequency groups assigned thereto;

means for assigning the two frequency groups in at least one of the homologous cells to alternate sectors in each cell, such that no two adjacent sectors in the same cell are assigned the same one of the two frequency groups; and means for determining when a mobile unit in one of the sectors is requesting access to the system and if so, whether the mobile unit is located in an inner portion or outer portion of the sector;

means for assigning a frequency to the mobile unit from the frequency group assigned to the sector depending upon whether the mobile unit is located in the inner or the outer portion of the sector, including means for determining which frequencies are in use in an outer sector of at least one homologous cell, and the means for assigning a frequency to the mobile unit assigns a frequency to the mobile unit which is not in use in the outer portion of the homologous cell.

5. A cellular communication system as in claim 4 wherein the means for determining additionally determines which frequencies are in use in the nearest outer sectors of the three nearest homologous cells.

6. A cellular communication system as in claim 4 wherein the means for determining whether the mobile unit is in an inner portion or outer portion of the sector compares a receive signal strength indication, or RSSI, against a predetermined threshold value.

7. A cellular communication system as in claim 6 wherein the predetermined threshold value is selected so that an inner portion of the sector encompasses approximately the same area as an outer portion of the sector.

8. A method for assigning a frequency to a mobile unit in a cellular communication system, the cellular communication system employing a number of base stations that each include an array of six directional sector antennas the sector antennas being centrally located in each cell to radiate into a sub-portion of the cell including a sixty (60) degree arc. and wherein each sector has a group of frequencies assigned to it that is the same as the group of frequencies assigned to two of the other sectors within that same cell which are not adjacent to the said sector, so that there are two different groups of frequencies assigned to each cell, the method comprising the steps of:

determining when a new mobile unit is requesting service from the cellular communication system;

detecting the sector within which the mobile is located by measuring a receive signal strength indication, or RSSI, of a signal received from the new mobile unit at each of the sector antennas;

detecting whether the new mobile unit is located in an inner sub-sector or outer sub-sector of the sector, by comparing the RSSI to a predetermined threshold value;

if the mobile unit is located in an outer sub-portion of the sector, assigning a frequency from the frequency set assigned to the sector to the mobile unit which is not in use in the outer sub-sectors of adjacent homologous cells; and if the mobile is located in the inner sub-sector, then assigning any frequency which is not already in use in the sector from the frequency set assigned to the sector.

9. A method as in claim 8 additionally comprising the step of:

if the mobile unit is located in an outer sub-portion of the sector, and it is not possible to assign a frequency which is not in use in the outer sub-sectors of the adjacent homologous cells, then performing an in-sector hand-off by reassigning a frequency previously assigned to one other operating mobile unit located in the inner sub-sector to the new mobile.

10. A method as in claim 9 wherein the step of performing an in-sector hand-off additionally assigns any frequency from the set assigned to the sectors to the other operating mobile located in the inner sub-sector.

11. A method for assigning a frequency to a mobile unit in a cellular communication system, the cellular communication system employing a number of base stations that each include an array of six directional sector antennas, the sector antennas being centrally located in each cell to radiate into a sub-portion of the cell including a sixty (60) degree arc, and wherein each sector has a group of frequencies assigned to it that is the same as the group of frequencies assigned to two of the other sectors within that same cell which are not adjacent to the said sector, so that there are two different groups of frequencies assigned to each cell, the method comprising the steps of:

determining when a new mobile unit is requesting service from the cellular communication system;

detecting the sector within which the mobile is located by measuring a receive signal strength indication, or RSSI, of a signal received from the new mobile unit at each of the sector antennas;

detecting whether the new mobile unit is located in an inner sub-sector or outer sub-sector of the sector, by comparing the RSSI to a predetermined threshold value; and if the mobile unit is located in an outer sub-portion of the sector, assigning a frequency to the mobile unit from the frequency set assigned to the sector which is not in use in the outer sub-sectors of adjacent homologous cells.

12. A method as in claim 11 additionally comprising the step of:

assigning frequency groups to the sectors of each cell such that no adjacent channel sets are in use along any cell or sector boundaries.

13. A method as in claim 11 wherein the step of assigning a frequency to a mobile unit in the outer sub-sector additionally comprises the step of assigning a frequency to the outer sector mobile which is also not in use in at least one of the outer sub-sectors of a nearest non-homologous cell.

14. A method as in claim 11 wherein the predetermined threshold amount is selected such that a boundary between inner and outer sub-sectors is located at a position which divides the area of the sector into equal area sub-sectors, so that on average one-half of the mobile units are located in each of the inner and outer sub-sectors.

* * * * *